3,518,268
SUBSTITUTED 5-CARBONYL- OR 5-THIOCAR-
BONYL-DIBENZO[b,f]AZEPINES
Kurt Adank, Muttenz, Basel-Land, Switzerland, assignor to Geigy Chemical Corporation, Greenburgh, N.Y., a corporation of Delaware
No Drawing. Filed Nov. 17, 1966, Ser. No. 594,986
Claims priority, application Switzerland, Nov. 24, 1965, 16,163/65
Int. Cl. C07d 51/70
U.S. Cl. 260—268                                   8 Claims

ABSTRACT OF THE DISCLOSURE 5-carbonyl or 5-thiocarbonyl-dibenz[b,f]azepines substituted by an esterified heterocyclic alkanol group are coronary dilators. An illustrative embodiment is the benzoic acid ester of 4-(5H-dibenz[b,f]azepine-5-carbonyl)-1-piperazinoethanol.

DETAILED DESCRIPTION

The present invention relates to new azepine derivatives, processes for their production and pharmaceutical compositions containing said azepine derivatives as well as the use thereof. The new azepine derivatives as well as their salts possess valuable pharmacological properties, for instance they exhibit an excellent dilatory activity in living bodies.

Compounds of the general Formula I

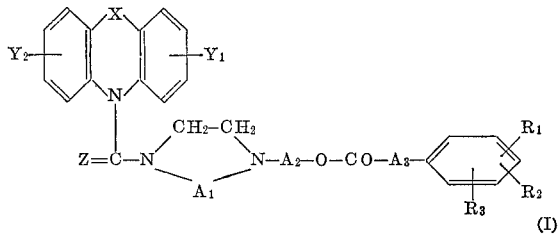

wherein:

X represents ethylene, propylene, vinylene, or methylvinylene,
$Y_1$ represents hydrogen, halogen, lower alkanoyl, lower alkyl, lower alkoxy or trifluoromethyl,
$Y_2$ represents hydrogen or the same halogen atom as $Y_1$,
Z represents O or S,
$A_1$ represents ethylene, propylene or trimethylene,
$A_2$ represents alkylene having 2–5 carbon atoms in a straight or branched chain which as 2–4 members,
$A_3$ represents vinylene or the direct bond,
$R_1$, $R_2$ and $R_3$ independently of each other represent hydrogen or lower alkoxy, and
$R_1$ can also represent the methylene dioxy group when $R_2$ and $R_3$ are hydrogen, and their addition salts with inorganic and organic acids, have not been known hitherto. It has now surprisingly been found that these compounds have an intensive, protracted dilatory effect on the coronary vessels. This effect is highly specific since the substances do not or only very slightly affect the peripheral vessels and the central nervous system. The influence on the other parameters of the heart is favourable (positive inotropic effect): increase of the performance of the heart. In addition, the therapeutic index is very favourable so that the compounds of general Formula I can be used as coronary dilators, e.g. for the treatment of acute and chronic coronary insufficiency (Angina pectoris) and for the prevention and aftertreatment of myocardial infarction. Insofar as an effect on the blood pressure can be determined, it is rather hypotensive.

In the compounds of general Formula I and the starting materials used therefor which are mentioned below, $Y_1$ is, e.g. hydrogen, chlorine, bromine, the methyl, ethyl, acetyl, methoxy, ethoxy, n-propoxy or isopropoxy group or the trifluoromethyl radical, and $Y_2$ is hydrogen or, like $Y_1$, chlorine or bromine. $A_2$ is, e.g. the ethylene, propylene, trimethylene, 1-methyl-trimethylene, 2-methyl-trimethylene, 2,2-dimethyl-trimethylene or tetramethylene radical.

To produce the new compounds of general Formula I, a compound of the general Formul II

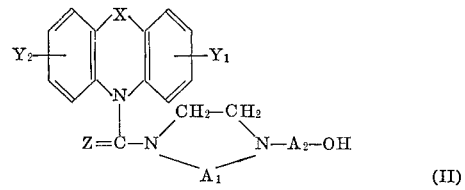

wherein X, $Y_1$, $Y_2$, Z, $A_1$ and $A_2$ have the meanings given in Formula I, is reacted with a reactive derivative of a carboxylic acid of the general Formula III

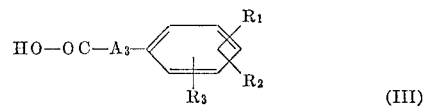

wherein $A_3$, $R_1$, $R_2$ and $R_3$ have the meanings given in Formula I, or a reactive ester of a compound of general Formula II is reacted with a salt of a carboxylic acid of general Formula III. Suitable derivatives of acids of general Formula III are, in particular, their halides and anhydrides as well as mixed anhydrides, e.g. with carbonic acid half esters of low alkanols. The reaction is performed, e.g. in the presence of an acid binding agent such as pyridine or triethylamine; an excess thereof or an inert organic solvent such as benzene, toluene, chloroform or dichlorethane can serve as reaction medium. The reaction temperature is preferably between 0° and the boiling temperature of the reaction medium. An alkali metal or an alkali metal compound such as sodium, potassium, lithium, sodium amide, lithium amide, sodium hydride or lithium hydride can also serve as acid binding agent.

The reaction of a salt, for example a sodium, potassium, lead or silver salt, of an acid of general Formula III with a reactive ester of a compound of general Formula II is performed, e.g. in a solvent or diluent such as isopropanol, acetone, dioxane, benzene, toluene or chloroform, at room temperature or moderately raised temperature. Suitable reactive esters are, e.g. the chlorides, bromides, methane sulphonic acid esters or arene sulphonic acid esters such as p-toluene sulphonic acid ester, which can be obtained e.g. from the compounds of general Formula III by reaction with the corresponding phosphorus halides or sulphonic acid chlorides.

Compounds of general Formula I are produced by a second process by reacting a compound of the general Formula IV

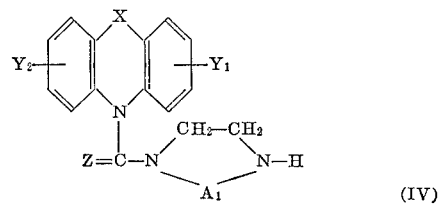

wherein X, $Y_1$, $Y_2$, Z and $A_1$ have the meanings given in Formula I, with a reactive ester of a compound of the general Formula V

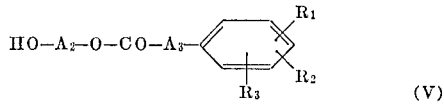

wherein $A_2$, $A_3$, $R_1$, $R_2$ and $R_3$ have the meanings given in Formula I, the reaction being performed in the presence of an acid binding agent. The reaction can be performed, for example, at moderately raised temperatures in organic solvents such as dimethyl formamide, sodium or potassium carbonate, for example, being used as acid binding agent. Suitable reactive esters of compounds of general Formula V are e.g. halides, particularly chlorides and bromides, also methane sulphonic acid esters and arene sulphonic acid esters, e.g. p-toluene sulphonic acid ester.

A third process for the production of compounds of general Formula I consists in reacting a halide of the general Formula VI

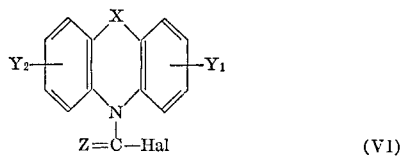

with a compound of the general Formula VII

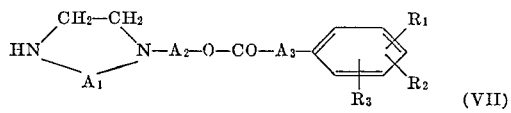

Compounds of the general Formula I are further prepared by reacting a compound of the general Formula VIII

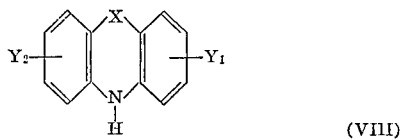

with a halide of the general Formula IX

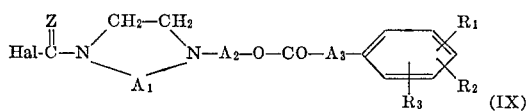

In the general Formulae VI and IX, Hal represents chlorine or bromine whilst the symbols X, $Y_1$, $Y_2$, Z, $A_1$, $A_2$, $A_3$, $R_1$, $R_2$ and $R_3$ in these and in the general Formulae VII and VIII have the meanings given in Formula I. The reactions are performed for example, by heating the reaction components in inert organic solvents such as benzene, toluene or xylene, preferably at the boiling temperature thereof and until the development of hydrogen halide has diminished or ceased.

Starting materials of the general Formulae II and IV are obtainable, e.g. analogously to the third process mentioned for the production of end products of general Formula I, using 1-(hydroxyalkyl)-piperazines, -2-methyl-piperazines, -3-methylpiperazines or -hexahydro-1H-1,4-diazepines or piperazine, 2-methyl-piperazine or hexahydro-1H-1,4-diazepine instead of compounds of the general Formula VII. Numerous reactive functional derivatives of carboxylic acids of the general Formula III are known or can be produced in the usual way from the known acids. Reactive esters of compounds of general Formula V are also known and others can be produced analogously. The same is true of the compounds of general Formulae VI and VIII. Starting materials of general Formula VII are obtained, e.g. by reacting reactive esters of compounds of general Formula V with piperazine, 2-methyl-piperazine or hexahydro-1H-1,4-diazepine (homopiperazine). Halides of the general Formula IX are formed by the action of phosgene, thiophosgene or carbonic acid dibromide on compounds of the general Formula VII or—with liberation of methyl or benzyl halide—on analogous compounds which are substituted in the 4-position of the piperazine or 1,4-diazepine ring by a methyl or benzyl group.

If the desired, the compounds of general Formula I obtained by the processes according to the invention are then converted in the usual way into their addition salts with inorganic and organic acids. For example, the acid desired as salt component or a solution thereof is added to a solution of a compound of general Formula I in an organic solvent such as methanol, ethanol or ether, and the precipitated salt is isolated. Instead of the free bases, pharmaceutically acceptable acid addition salts can be used in compositions, i.e. salts with those acids the anions of which are pharmaceutically acceptable in the usual dosages. In addition, it is of advantage if the salts to be used in compositions crystallise well and are not or are only slightly hygroscopic. For example, hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicyclic acid, phenyl acetic acid, mandelic acid and embonic acid can be used for salt formation with compounds of the general Formula I.

The new active substances are administered orally, rectally and parenterally. The daily dosages of the free bases or of pharamaceutically acceptable salts thereof vary between 5 mg. and 200 mg. for adult patients. Suitable dosage units such as dragées, tablets, suppositories or ampoules, preferably contain 5–50 mg. of an active substance according to the invention or a non-toxic salt thereof.

Dosage units for oral administration preferably contain between 1–90% of a compound of general Formula I or a nontoxic salt thereof as active substance. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (Carbowaxes) of suitable molecular weights to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs may be added to these coatings, e.g. to distinguish between varying dosages of active substance.

Examples of dosage units for rectal administration are suppositories which consist of a combination of an active substance or a suitable salt thereof with a neutral fatty foundation, or also gelatine rectal capsules which contain a combination of the active substance or a suitable salt thereof with polyethylene glycols (Carbowaxes) of suitable molecular weight.

Ampoules for parenteral administration preferably contain a water soluble salt of an active substance in a concentration of, preferably, 0.2–5%, in aqueous solution, optionally together with suitable stabilising agents and buffer substances and also solubility promoters.

The following prescriptions further illustrate the production of tablets and dragées:

(a) 250 g. of maleate or hydrochloride of 3,4,5-trimethoxy benzoic acid ester of 4-(5H-dibenzo[b,f]azepine-5-carbonyl)-1-piperazinoethanol are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance (maleate or hydrochloride). If desired, the tablets can be grooved for better adaptation of the dosage.

(b) A granulate is produced from 250 g. of the hydrochloride of benzoic acid ester of 4-(5H-dibenz[b,f]azepine-5-carbonyl)-1-piperazinoethanol, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 of magnesium stearate and the mixture is pressed into 10,000 dragée cores. These are then coated with a concentrated syrup made from 502.28 g. of crystallised saccharose, 6 g. of shellac, 10 g. of gum arabic, 0.22 g. of dyestuff and 1.5 g. of titanium dioxide. The dragées obtained each weigh 120 mg. and contain 25 mg. of active substance (hydrochloride).

As mentioned above, the subject compounds possess valuable pharmacological properties in living bodies when they are administered in therapeutic doses; they can be characterized as dilatory agents.

Merely by way of illustration, some of the compounds of Formula I were tested in animals. The maleate of 3,4,5-trimethoxybenzoic acid ester of 4-(5H-dibenz[b,f]-azepine - 5 - carbonyl)-hexahydro-1H-1,4-diazepine - 1-ethanol demonstrated a pronounced dilatory action in doses of 1γ to 100γ injected into the perfusion circuit of the isolated heart preparation of guinea pigs. This compound shows only an uncharacteristic and small dilatory effect on the perepheric vessels of the rabbit which proves that the compound has a high specificity directed to the coronary artery.

Thus, the index between the two vascular actions is in favour of the coronary arteries. Apart from this specific action the compound shows only a small spasmolytic effect in the isolate ileum of guinea pigs. In dosages of 1 mg./kg. on intravenous administration to anesthetized cats, the reaction on the blood pressure is a short and unspecific depressive effect which lasts only a few minutes.

The heart rate does not change at all in the dose range of 0.1 to 1.0 mg./kg. The action of noradrenaline and the blood pressure are not influenced by the compound when administered.

On the central nervous system, the compound has proved to be ineffective in various tests on rats, mice and gold hamsters.

The acute toxicity of the maleate of 3,4,5-trimethoxy-benzoic acid ester of 4-(5H-dibenz[b,f]azepine-5-carbonyl)-hexahydro-1H - 1,4 - diazepine-1-ethanol on oral administration of single doses to mice was higher than 5000 mg./kg.

Very good dilatory effects were also noted when the hydrochloride of 3,4,5-trimethoxy-benzoic acid ester of 4 - (10,11 - dihydro-5H-dibenz[b,f]azepine-5-carbonyl)-1-piperazinoethanol, the hydrochloride of the 3,4,5-trimethoxycinnamic acid ester of 4-(5H-dibenz[b,f]azepine-5-carbonyl)-1-piperazinoethanol, the hydrochloride of the 3,4,5-trimethoxybenzoic acid ester of 4-(3-acetyl-10,11-dihydro-5H-dibenz[b,f]azepine - 5 - carbonyl)-1-piperazinoethanol, and the hydrochloride of the 3,4,5-trimethoxybenzoic acid ester of 4-(10,11-dihydro-5H-dibenz[b,f]azepine - 5 - carbonyl)-1-piperazinopropanol were injected into the perfusion circuit of the isolated heart preparation of guinea pigs in doses of 1γ to 100γ. The acute toxicity of all above-mentiond compounds was higher than 5000 mg./kg. on oral administration to mice in single doses.

The following examples further illustrate the production of the new compounds of general Formula I and of hitherto unknown intermediate products, but they in no way limit the scope of the invention. The temperatures are given in degrees centigrade.

EXAMPLE 1

20 g. of benzoyl chloride in 50 ml. of chloroform are added dropwise to 35 g. of 4-(5H-dibenz[b,f]azepine-5-carbonyl)-1-piperazinoethanol in 100 ml. of dry pyridine, the addition being made at 10°. The reaction solution is then stirred for 10 hours at room temperature, completely evaporated and the residue is taken up in chloroform. The chloroform solution is washed free of acid with 2 N sodium hydroxide solution, dried and evaporated. The residue is dissolved in benzene and filtered through five times the amount of aluminum oxide whereupon the reaction product, after evaporation of the benzene, is obtained as a pale yellow oil. With ethanolic hydrochloric acid, this yields the hydrochloride of the benzoic acid ester of 4 - (5H-dibenz[b,f]azepine-5-carbonyl)-1-piperazinoethanol, half hydrate, M.P. 128–130°.

The following esters are obtained in an analogous way:

(a) With anisic acid chloride, the anisic acid ester of 4-(5H-dibenz[b,f]azepine-5 - carbonyl) - 1 - piperazinoethanol, maleate M.P. 145–147°;

(b) With o-methoxybenzoyl chloride, the o-methoxybenzoic acid ester, hydrochloride M.P. 197–199°;

(c) With piperonylic acid, the piperonylic acid ester, hydrochloride M.P. 150°, and (d) With 3,4,5-trimethoxybenzoyl chloride, the 3,4,5-trimethoxy benzoic acid ester, maleate M.P. 106–108°, hydrochloride M.P. 119–121°.

The starting material necessary for the above reaction is produced, e.g., as follows:

51.0 g. of 5H-dibenz[b,f]azepine-5-carbonyl chloride and 52.0 g. of 1-piperazinoethanol in 400 ml. of absolute benzene are refluxed for 6 hours. After cooling, water is added and the whole is well stirred. The crystal slurry is then filtered off under suction, washed with a large amount of water and dried in vacuo. After recrystallisation from benzene, the 4-(5H-dibenz[b,f]azepine-5-carbonyl)-1-piperazinoethanol melts at 169–170°. The hydrochloride melts at 237–238°.

The 4-(10,11 - dihydro-5H - dibenz[b,f]azepine-5-carbonyl)-1-piperazinoethanol is obtained in an analogous way. M.P. 160–162° (from methanol). The hydrochloride melts at 223–225°. The hydrochloride salt of the corresponding benzoic acid ester melts at 188–190°.

EXAMPLE 2

13 g. of veratryl chloride dissolved in 50 ml. of chloroform are added to 18 g. of 4-(5H-dibenz[b,f]azepine-5-carbonyl)-1-piperazinoethanol (cf. Example 1) in 50 ml. of chloroform. A strong reaction causes the chloroform to boil. The reaction solution is then refluxed for a short time. After cooling, the precipitated hydrochloride of the starting material is filtered off under suction and the chloroform solution is completely evaporated. The veratric acid ester of 4 - (5H-dibenz[b,f]azepine-5-carbonyl)-1-piperazino-ethanol which remains is dissolved in acetone and maleic acid is added. The maleate obtained melts at 143–145°.

EXAMPLE 3

17.5 g. of 4-(10,11 - dihydro-5H-dibenz[b,f]azepine-5-carbonyl)-1-piperazinoethanol (cf. Example 1, last sentence) are dissolved in 75 ml. of absolute pyridine and, at 10°, 15 g. of 3,4,5-trimethoxybenzoyl chloride dissolved in 30 ml. of chloroform are added all at once while stirring. On completion of the exothermic reaction, the mixture is stirred for about 14 hours at room temperature, then evaporated, the residue is taken up in chloroform and is washed with 2 N ice cold sodium hydroxide solution. The chloroform solution is then dried and evaporated. The residue is taken up in benzene and filtered through eight times the amount of aluminium oxide. On evaporating the filtrate, 3,4,5-trimethoxy-benzoic acid ester of 4 - (10,11-dihydro-5H-dibenz[b,f]azepine-5-carbonyl)-1-piperazinoethanol remains as an oil. This yields, with hydrogen chloride in dry acetone, the hydrochloride which melts at 203–205°.

The following substituted piperazinoethanols may be obtained in an analogous manner:

(a) 4 - (3-chloro-10,11-dihydro-5H-dibenz[b,f]azepine-5-carbonyl) - 1 - piperazinoethanol (hydrochloride M.P. 197–199°), 3,4,5-trimethoxybenzoic acid ester, maleate M.P. 117–119°;

(b) 4 - (3-chloro-5H-dibenz[b,f]azepine-5-carbonyl)-1-piperazinoethanol (hydrochloride M.P. 148–151°), 3,4,5-trimethoxybenzoic acid ester, fumarate M.P. 154–156°;

(c) 4-(3,7-dichloro-10,11-dihydro - 5H - dibenz[b,f]azepine-5-carbonyl)-1-piperazinoethanol (hydrochloride M.P. 255–258°), 3,4,5-trimethoxybenzoic acid ester, maleate, M.P. 182–183°;

(d) 4-(3,7-dichloro-5H - dibenz[b,f]azepine - 5-carbonyl)-1-piperazinoethanol (hydrochloride M.P. 261–263°), 3,4,5-trimethoxybenzoic acid ester, maleate M.P. 198–200°;

(e) 4 - (3 - acetyl - 10,11 - dihydro - 5H - dibenz[b,f]azepine-5-carbonyl) - 1 - piperazinoethanol (half hydrate, M.P. 139–141°), 3,4,5-trimethoxybenzoic acid ester, hydrochloride M.P. 205–207°;

(f) 4 - (2 - methoxy - 10,11 - dihydro-5H-dibenz[b,f]azepine-5-carbonyl)-1-piperazinoethanol (oil), 3,4,5-trimethoxybenzoic acid ester, maleate M.P. 105–108°;

(g) 4 - (3 - methoxy - 10,11 - dihydro - 5H - dibenz[b,f]azepine - 5 - carbonyl) - 1 - piperazinoethanol hydrochloride, M.P. 175–179°), 3,4,5 - trimethoxybenzoic acid ester, fumarate M.P. 141–142°;

(h) 4 - (10 - methyl - 5H - dibenz[b,f]azepine-5-carbonyl)-1-piperazinoethanol (M.P. 139–141°), 3,4,5-trimethoxybenzoic acid ester, maleate, hydrate M.P. 142–145°.

EXAMPLE 4

18 g. of 3,4,5-trimethoxycinnamic acid chloride dissolved in 30 ml. of absolute chloroform are added in one portion to a solution of 18 g. of 4-(5H-dibenz[b,f]azepine 5 - carbonyl) - 1 - piperazinoethanol in 100 ml. of dry pyridine, the addition being made at 5–10°. The temperature rises to about 45°, whereupon the reaction mixture is stirred for 10 hours at room temperature and then evaporated. The residue is dissolved in methylene chloride and washed with ice cold 2 N sodium hydroxide solution. The methylene chloride solution is dried with sodium sulphate and concentrated. The residue is dissolved in benzene and chromatographed on a column of 400–500 g. of aluminium oxide (activity I). The yellowish oil which is obtained solidifies after a short time. On dissolving in benzene and adding petroleum ether, the 3,4,5-trimethoxycinnamic acid ester of 4-(5H-dibenz[b,f]azepine - 5 - carbonyl) - 1 - piperazinoethanol is obtained as colourless crystals which melt at 153–155°, In absolute acetone, the hydrochloride is obtained with ethereal hydrochloric acid, M.P. 200–203°.

EXAMPLE 5

23.0 g. of 3,4,5-trimethoxybenzoyl chloride in 60 ml. of chloroform are added dropwise to 17.0 g. of 4-(5H-dibenz[b,f]azepine - 5 - carbonyl) - hexahydro-1H-1,4-diazepine-1-ethanol in 100 ml. of dry pyridine, the addition being made at 10°. The reaction solution is then stirred for another 15 hours at room temperature, then completely evaporated and the residue is taken up in methylene chloride. The methylene chloride solution is washed free of acid with ice cold 2 N sodium hydroxide solution. The residue is dissolved in benzene and filtered through six times the amount of aluminum oxide whereupon, after evaporation of the benzene, the reaction product is obtained as a yellow oil. This, with maleic acid in dry acetone, yields the maleate of 3,4,5-trimethoxy-benzoic acid ester of 4 - (5H - dibenz[b,f]azepine-5-carbonyl) - hexahydro - 1H - 1,4 - diazepine - 1 - ethanol, which melts at 128–130°.

On treating the yellow oil with hydrochloric acid in dry acetone, the corresponding hydrochloride of 3,4,5-trimethoxybenzoic acid ester of 4 - (5H - dibenz[b,f]azepine - 5 - carbonyl) - hexahydro - 1H - 1,4 - diazepine-1-ethanol is obtained which melts at 119–121°.

The starting material necessary for this reaction is produced as follows:

13 g. of 5H - dibenz[b,f]azepine - 5 - carbonyl chloride, 8 g. of hexahydro - 1H - 1,4 - diazepine - 1 - ethanol (produced from hexahydro-1H-1,4-diazepine and ethylene oxide in methanol) and 10 g. of potassium carbonate in 100 ml. of dimethyl formamide are heated for 12 hours at 50°. After cooling, the inorganic residue is filtered off and the dimethyl formamide is distilled off in vacuo whereupon the reaction product remains as a viscous oil which can be used for further reaction direct.

EXAMPLE 6

4.0 g. of benzoic acid and 1.8 g. of pulverized potassium hydroxide in 70 ml. of isopropanol are refluxed for 10 minutes. 12 g. of 1 - (2 - chloroethyl - 4 - (5H-dibenz[b,f]azepine - 5 - carbonyl) - piperazine produced from 4 - (5H - dibenz[b,f]azepine - 5 - carbonyl) - 1 - piperazinoethanol and thionyl chloride in benzene at 50–60°) in a mixture of 110 ml. of isopropanol/acetone (5:2) are added dropwise to this suspension and the whole is refluxed for 3 hours. After cooling, the reaction mixture is concentrated in vacuo, the residue is taken up in methylene chloride, the methylene chloride solution is washed free of acid with 2 N sodium hydroxide solution and then washed neutral with water, dried and concentrated. The residue is dissolved in benzene and filtered through 50 g. of aluminium oxide whereupon, after evaporating off the benzene, the reaction product is obtained as a yellow-brown oil. This, with ethanolic hydrochloric acid, yields the hydrochloride of the benzoic acid ester of 4-(5H - dibenz[b,f]azepine - 5 - carbonyl) - 1 - piperazinoethanol half hydrate, M.P. 128–130° (cf. Example 1).

If using maleic acid in ethanol, the corresponding maleate salt (instead of the hydrochloric salt), half hydrate, M.P. 106–108°, is obtained.

EXAMPLE 7

35 g. of 3,4,5-trimethoxybenzoyl chloride dissolved in 75 ml. of chloroform are added dropwise to a solution of 36.5 g. of 4 - (5H - dibenz[b,f]azepine - 5 - thiocarbonyl) - 1 - piperazinoethanol in 100 ml. of pyridine, the addition being made at 10°. The reaction solution is then stirred for 15 hours at room temperature, then completely evaporated and the residue is taken up in methylene chloride. The methylene chloride solution is washed free of acid with 2 N sodium hydroxide solution, dried and concentrated. The residue is dissolved in benzene and filtered through 10 times the amount of aluminium oxide whereupon, after evaporating off the benzene, the 3,4,5 - trimethoxybenzoic acid ester of 4 - (5H - dibenz[b,f]azepine - 5 - thiocarbonyl) - 1 - piperazinoethanol remains as an oil. This, with fumaric acid in acetone, yields the fumarate, M.P. 120–122°.

The starting material necessary for the above reaction is produced, e.g., as follows:

15 g. of thiophosgene dissolved in 50 ml. of toluene are added dropwise to a suspension of 19.3 g. of 5H-dibenz[b,f]azepine in 200 ml. of toluene. The mixture is then heated for 3 hours at 60°, allowed to cool, 20 g. of 1-piperazinoethanol dissolved in 100 ml. of toluene are added whereupon the whole is refluxed for 12 hours. After cooling, water is added and stirred in well. The organic phase is then removed and the toluene is completely evaporated off. The crystal slurry which remains is dissolved in benzene and filtered through ten times the amount of aluminum oxide. After evaporating off the benzene, the 4-(5H-dibenz[b,f]azepine-5-thiocarbonyl)-1-piperazinoethanol remains as a yellow oil. This can be used for further reaction without purification.

EXAMPLE 8

15 g. of 1-(5H-dibenz[b,f]azepine-5-carbonyl)-piperazine, hydrochloride M.P. 250°, (produced from 13 g. of 5H-dibenz[b,f]azepine-5-carbonyl chloride and 22 g. of piperazine in 200 ml. of boiling methylethyl ketone with the addition of 7.5 g. of sodium iodide), 12 g. of benzoic acid-2-chloroethyl ester and 7.5 g. of sodium iodide in 150 ml. of methylethyl ketone are refluxed for 8 hours. After cooling, the reaction mixture is filtered, the filtrate is completely evaporated, the residue is dissolved in benzene and the solution is filtered through 200 g. of aluminum oxide. After evaporating off the benzene, the benzoic acid ester of 4-(5H-dibenz[b,f]azepine-5-carbonyl)-1-piperazinoethanol remains as a yellowish oil. This, with ethanolic hydrochloric acid, yields the half hydrate of the hydrochloride, M.P. 127–129°. When the benzoic acid ester obtained above is mixed with the compound produced according to Example 1, there is no depression of the melting point.

EXAMPLE 9

12.4 g. of 10,11-dihydro-5H-dibenz[b,f]azepine-5-carbonyl chloride and 15 g. of benzoic acid ester of 1-piperazinoethanol (produced from the sodium compound of 1-piperazinoethanol and benzoyl chloride in benzene) and 10 g. of potassium carbonate in 100 ml. of dimethyl formamide are heated for 15 hours at 60°. The reaction solution is then filtered, the filtrate is completely evaporated, the residue is dissolved in benzene and the solution is filtered through 200 g. of aluminum oxide. After evaporating off the benzene, the benzoic acid ester of 4-(10,11-dihydro-5H-dibenz[b,f]azepine - 5 - carbonyl)-1-piperazinoethanol remains as a yellow oil. With maleic acid in ethanol, it yields the maleate, hydrate, M.P. 106–108°.

EXAMPLE 10

23.4 g. of the benzoic acid ester of 1-piperazinoethanol are dissolved in 100 ml. of absolute toluene and, while stirring at 0–10°, 50 ml. of a 20% phosgene solution in toluene are added. The reaction mixture, which contains the benzoic acid ester of 4-chlorocarbonyl-1-piperazinoethanol, is then brought to room temperature and then a suspension of 19.3 g. of 5H-dibenz[b,f]azepine in 250 ml. of absolute toluene and another 30 ml. of the 20% phosgene solution in toluene are added. The reaction mixture is then stirred well for 2 hours at room temperature and afterwards for another 2 hours at 70–80°. After cooling, the reaction mixture is completely evaporated, the residue is dissolved in benzene and filtered through eight times the amount of aluminum oxide (activity I). After evaporating off the benzene, a yellow oil remains which, with ethereal hydrochloric acid in acetone, yields the hydrochloride of the benzoic acid ester of 4-(5H-dibenz[b,f]azepine - 5 - carbonyl) - 1 - piperazinoethanol. The half hydrate melts at 128–130° (cf. Example 1).

EXAMPLE 11

15 g. of 1-(10,11-dihydro-5H-dibenz[b,f]azepine-5-carbonyl)-piperazine, M.P. 136–138°, hydrochloride M.P. 157–159° (produced from 15 g. of 10,11-dihydro-5H-dibenz[b,f]azepine-5-carbonyl chloride and 22 g. of piperazine in 200 ml. of boiling methylethyl ketone with the addition of 7.5 g. of sodium iodide), 15 g. of 3,4,5-trimethoxybenzoic acid-3-chloropropyl ester and 6 g. of sodium idoide in 100 ml. of methylethyl ketone are refluxed for 14 hours. After cooling, the reaction mixture is completely evaporated, the residue is dissolved in water and methylene chloride, and the aqueous phase is extracted well with methylene chloride. The methylene chloride solution is then washed with ice-cold 2 N sodium hydroxide solution, then with water, dried and concentrated. The residue is dissolved in benzene and the solution is filtered through five times the amount of aluminum oxide (activity I). After evaporation of the filtrate, the 3,4,5-trimethoxybenzoic acid ester of 4-(10,11-dihydro-5H-dibenz[b,f]azepine-5-carbonyl)-1 - piperazinopropanol remains as a pale yellowish oil. With hydrogen chloride in a mixture of absolute methanol/acetone, this yields the hydrochloride which melts at 195–197°.

The 3,4,5-trimethoxybenzoic acid-3-chloropropyl ester necessary for the reaction described above, is produced, e.g., as follows:

A mixture of 14 g. of 3-chloro-1-propanol, 23 g. of 3,4,5-trimethoxybenzoyl chloride and 14 g. of potassium carbonate in 200 ml. of absolute benzene is refluxed for 5 hours. After cooling, the reaction mixture is filtered, the filtrate is completely evaporated and the oil which remains is distilled under high vacuum, B.P. 160–162°/0.001 (viscous oil which crystallises immediately).

I claim:
1. A compound of the formula:

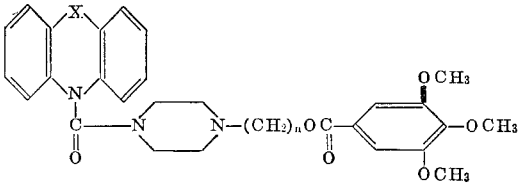

wherein X is ethylene or vinylene and
$n$ is 2, 3 or 4.

2. The pharmaceutically acceptable non-toxic acid addition salts of a compound according to claim 1.

3. The compound according to claim 1 which is the 3,4,5-trimethoxybenzoic acid ester of 4-(5H-dizenz[b,f]azepine-5-carbonyl)-1-piperazinoethanol.

4. The pharmaceutically acceptable non-toxic acid addition salts of the compound according to claim 3.

5. The compound according to claim 1 which is the 3,4,5-trimethoxybenzoic acid ester of 4-(10,11-dihydro-5H-dibenz[b,f]azepine-5-carbonyl)-1-piperazinoethanol.

6. The pharmaceutically acceptable non-toxic acid addition salts of the compound according to claim 5.

7. The compound according to claim 1 which is the 3,4,5-trimethoxybenzoic acid ester of 4-(10,11-dihydro-5H-dibenz-[b,f]azepine - 5 - carbonyl) - 1 - piperazinopropanol.

8. The pharmaceutically acceptable non-toxic acid addition salts of the compound according to claim 7.

References Cited

UNITED STATES PATENTS

| | | | |
|---|---|---|---|
| 3,068,222 | 12/1962 | Craig | 260—268 X |
| 3,074,931 | 1/1963 | Craig | 260—239 |
| 3,325,486 | 6/1967 | Toldy et al. | 260—268 X |
| 3,337,538 | 8/1967 | Schuler | 260—239 |

OTHER REFERENCES

Toldy et al.: Hungarian Patent 150,956, November 1963 as abstracted in Chem. Abstr., vol. 60, Col. 8045–6 (1964).

Toldy et al.: Acta Chem. Acad. Sci. Hung. vol. 44, pp. 301–25 (1965), Abstracted in Chem. Abstr., vol. 63, Col. 14853–5 (November 1965).

DONALD G. DAUS, Primary Examiner

U.S. Cl. X.R.

260—239, 473, 544; 424—250